Patented Feb. 17, 1942

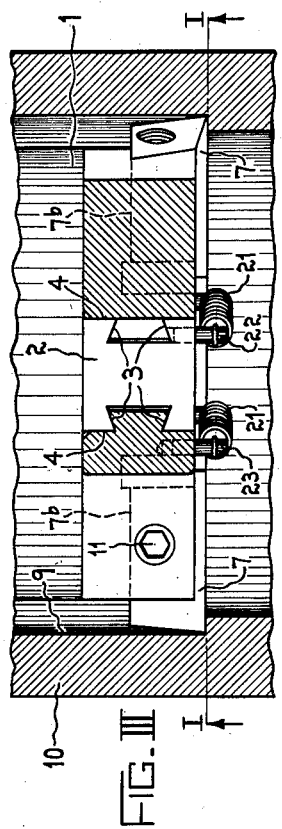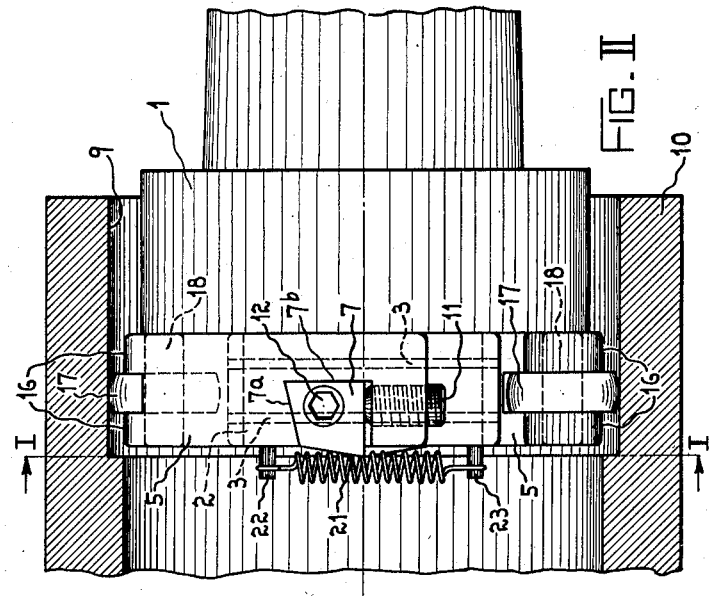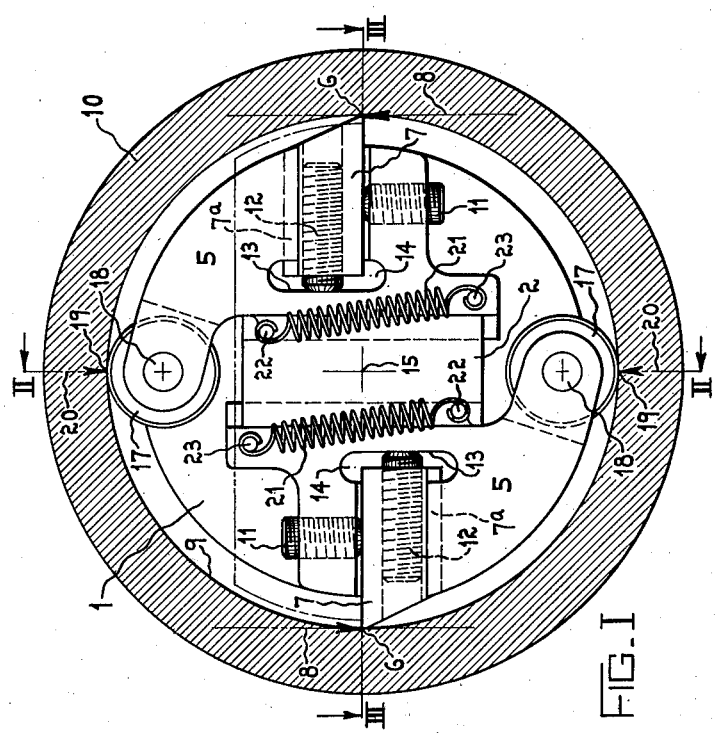

2,273,258

UNITED STATES PATENT OFFICE 2,273,258

BORING TOOL HOLDER

Willard L. Groene, Cincinnati, Ohio, assignor to The R. K. Le Blond Machine Tool Company, Cincinnati, Ohio, a corporation of Delaware Application May 9, 1941, Serial No. 392,745

9 Claims. (Cl. 77—58)

This invention pertains to a boring tool holder arrangement which is floatingly mounted on a boring bar for use in boring tubes or gun barrels in lathe of a type, for example, as shown in Patent Number 1,363,506, in which the tubular work piece is chucked and rotated while the boring bar carrying the unique floating boring tool is moved through the bore of the work longitudinally of the axis of rotation of the lathe. More specifically, this invention pertains to certain particular improvements to boring tool holders of the type set forth in my earlier copending application, Serial Number 347,338, filed July 24, 1940.

One of the objects of this invention is to provide a tool holder with a pair of floatingly mounted tool carrying members, each of which contacts the work piece at a point diametrically opposite the point of contact of the other, and each of which has a cutting tool which engages the work piece at diametrically opposite positions and said positions being 90 degrees circumferentially removed from the point of contact of the tool carrying members with the work.

Another object of this invention is to provide a tool holder arrangement for boring relatively long holes in gun barrels, which comprises a tool holding member which is slidably mounted on the boring bar of the machine in which it is mounted, so that it may have free sliding floating movement radially of the axis of rotation of the work, and to limit said radial sliding floating movement by contact of the tool holding member with the work at a point substantially 90 degrees circumferentially removed from the point of engagement of the cutting tool with the work piece.

It is also an object of this invention to provide in conjunction with this sliding floatingly mounted tool holder, resilient means, such as a spring, for initially lightly engaging the tool holder in contact with the work piece so as to maintain light contact therewith at all times, whether or not the cutting tools are actually cutting upon the work bore to be machined.

Further features and advantages of this invention will appear in the detailed description of the drawing in which:

Figure I is a front end axial view partly in section on the line I—I of Figures II and III, of the tool holder clearly showing the floating tool holder elements thereof contacting the work at diametrically opposite positions and each having a cutting tool engaging the work at diametrically opposite points substantially 90 degrees circumferentially removed from the point of contact of the tool holders with the work bore.

Figure II is a longitudinal section through the work, showing a side view of the tool holder on the line II—II of Figure I.

Figure III is a longitudinal section through the work and tool holder, as indicated by the line III—III in Figure I.

On the boring bar 1 appropriately mounted in a suitable holder in a gun boring lathe of the type cited in the above mentioned Patent Number 1,363,506 is formed a projecting member 2 formed integral with the boring bar 1 and having dove tails 3 formed in the faces 4 in which are slidably mounted the floating tool holders 5 so as to cause the cutting edges 6 of the cutting tools 7 carried in these floating tool holders 5, to have tangential floating movement in a line 8 which is substantially tangent to the bore 9 of the work piece 10. These cutting tools 7 are held in suitable slots formed by the faces 7a and 7b in each of the tool holders 5 and locked in place by a suitable clamping screw 11, an adjusting screw 12 appropriately threaded in a tapped hole in the tool 7 and abutting against the rear face 13 of the slot 14 formed in the tool holder 5 serves to accurately position and hold the cutting edge 6 of the cutting tool in proper relation to the bore 9 and the axis of rotation 15 of the work.

On the floating tool holders 5 are formed bifurcated projecting end portions 16 in which is carried the work contacting rollers 17 on suitable studs 18 fixed in the bifurcated end portions 16 and which rollers 17 engage the bore 9 of the work 10 at a point 19 which is substantially 90 degrees circumferentially removed from the point of contact of the cutting edge 6 of the tool 7 and which points 19 are diametrically opposite each other in the bore of the work 10. Contact of these rollers 17 with the bore 9, limits the floating movement of the tool holder 5 on the dove tail 3 in the direction caused by the cutting action of the work and tools at the point 6 as illustrated by the arrow for the line 8, so that in effect the work acts as a counteracting force for the respective cutting tool of its tool holder, in the direction indicated by the line and arrow 20.

In order to maintain initial relatively light contacting engagement of the rollers 17 with the bore 9 of the work at all times and particularly when the roller is at some other position than the bottom of the work bore, tension springs 21 are provided which have one of their ends connected to pin 22 fixed in the portion 2 of the boring bar 1, and have their other ends connected to a pin 23 fixed in the tool holder 5. In this way tension in the spring 21 at all times tends to urge the tool holder 5 and its respective roller 17 into engagement with the bore 9, whether or not the cutting tools 7 are actually cutting on the work.

During the normal operation of this boring tool it is entirely practical to start it in an initially eccentric or rough bore and move the cutting tools 7 outwardly by adjusting the adjusting screws 12 until the proper smooth, accurate and concentric bore is generated. It is then the object after having thus prepared the bore 9 in the work to feed it longitudinally of the axis 15 of rotation of the work, so as to progressively cut a bore through the work piece.

It is also to be noted that in this particular arrangement the cutting forces resulting in the operation of the tools 7 in the bore of the work, results in substantially neutralizing forces being set up in the rollers 17 in engaging the work at the points 19 and since these forces are diametrically opposite each other, they substantially neutralize each other so that there will be substantially no radial distortion or bending forces set up in the boring bar 1.

Having thus fully set forth and described my invention what I claim as new and desire to secure by United States Letters Patent is:

1. In a boring tool holder arrangement, a pair of cutting tools having their cutting edges adapted to engage the bore of a work piece at diametrically opposite positions, means providing tangential floating movement of the cutting edges of said cutting tools relative to the bore of the work piece, and means engaging the bore of said work piece for limiting said tangential floating movement.

2. In a boring tool holder arrangement, a pair of cutting tools having their cutting edges engaging a bore of a work piece at diametrically opposite positions, means providing tangential floating movement of the cutting edges of said cutting tools relative to said bore, and means, engaging said bore at diametrically opposite positions and 90 degrees circumferentially removed from the point of engagement of said cutting edges with the bore, for limiting said tangential floating movement.

3. In a boring tool holder arrangement, a cutting tool having a cutting edge adapted to engage a bore of a work piece to be machined, means providing tangential floating movement of the cutting edge of said cutting tool relative to said bore, means engaging the work bore for limiting said tangential movement, a second cutting tool, having a cutting edge arranged to engage said bore, means providing tangential floating movement in said second mentioned cutting tool, and means engaging said bore for limiting the floating movement of said second mentioned tool.

4. In a boring tool holder arrangement, a pair of floating tool holders mounted on a boring bar, means contacting the bore of the work to be machined for limiting the floating movement of each of said tool holders, and cutting tools in each of said tool holders arranged to operate upon the bore of said work piece.

5. In a boring tool holder arrangement, a pair of floating tool holders mounted on a boring bar, means contacting the bore of the work to be machined for limiting the floating movement of each of said tool holders, and cutting tools in each of said tool holders arranged to operate upon the bore of said work piece, and resilient means for normally urging said tool holders into contact with said work bore.

6. In a boring tool holder arrangement, a boring bar, a pair of tool holders reciprocatably mounted on the end of said boring bar for radial movement relative to the axis of rotation of a work piece to be bored, cutting tools in said tool holders having their cutting edges arranged to engage the bore of said work piece, and means on said tool holder for engaging the bore of said work piece to limit the reciprocating movement of said tool holders.

7. In a boring tool holder arrangement, a boring bar, a pair of tool holders reciprocatably mounted on the end of said boring bar for radial movement relative to the axis of rotation of a work piece to be bored, cutting tools in said tool holders having their cutting edges arranged to engage the bore of said work piece, and means on said tool holder for engaging the bore of said work piece to limit the reciprocating movement of said tool holders, and means for normally holding said work engaging means in initial contact with the bore of said work piece.

8. In a boring tool holder arrangement, a boring bar, a pair of parallel guideways formed on said bar in a direction substantially radial of the axis of rotation of a work piece to be operated upon by said apparatus, a cutting tool holder mounted on each of said guideways, cutting tools in said tool holders arranged to engage the bore of the work piece, and means on each of said tool holders engaging the bore of said work piece to limit the movement of said tool holders on said guideways.

9. In a boring tool holder arrangement, a boring bar, a pair of parallel guideways formed on said bar in a direction substantially radial of the axis of rotation of a work piece to be operated upon by said apparatus, a cutting tool holder mounted on each of said guideways, cutting tools in said tool holders arranged to engage the bore of the work piece, and means on each of said tool holders engaging the bore of said work piece to limit the movement of said tool holders on said guideways, and resilient means interconnected between said boring bar and each of said tool holders for normally urging said tool holders into engagement with the bore of said work piece.

WILLARD L. GROENE.